(12) United States Patent
Wei et al.

(10) Patent No.: US 10,893,706 B2
(45) Date of Patent: Jan. 19, 2021

(54) ATOMIZATION DEVICE AND ELECTRONIC CIGARETTE WITH THE SAME

(71) Applicant: SHENZHEN SMOORE TECHNOLOGY LIMITED, Shenzhen (CN)

(72) Inventors: Yisong Wei, Shenzhen (CN); Xing Shi, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 404 days.

(21) Appl. No.: 16/120,389

(22) Filed: Sep. 3, 2018

(65) Prior Publication Data

US 2019/0313693 A1    Oct. 17, 2019

(30) Foreign Application Priority Data

Apr. 17, 2018   (CN) .......................... 2018 1 0341985

(51) Int. Cl.
| | |
|---|---|
| *A24F 40/42* | (2020.01) |
| *A24F 40/10* | (2020.01) |
| *A24F 40/40* | (2020.01) |
| *A24F 47/00* | (2020.01) |

(52) U.S. Cl.
CPC ............ *A24F 47/008* (2013.01); *A24F 40/10* (2020.01); *A24F 40/40* (2020.01); *A24F 40/42* (2020.01)

(58) Field of Classification Search
CPC ........... A24F 40/42; A24F 40/10; A24F 40/40
See application file for complete search history.

(56) References Cited

U.S. PATENT DOCUMENTS

| | | |
|---|---|---|
| 5,249,611 A | 10/1993 | Law |
| 2018/0303158 A1 | 10/2018 | Chen |

FOREIGN PATENT DOCUMENTS

| | | |
|---|---|---|
| CN | 105192896 A | 12/2015 |
| EP | 3348155 A1 | 7/2018 |
| WO | 2018046530 A1 | 3/2018 |

OTHER PUBLICATIONS

European Patent Office Search Report for 18191921.8-1006, European Patent Office, dated Mar. 19, 2019.

*Primary Examiner* — Eric Yaary
*Assistant Examiner* — Jennifer A Kessie
(74) *Attorney, Agent, or Firm* — Hemisphere Law, PLLC; Zhigang Ma

(57) ABSTRACT

The present disclosure provides an atomization device including a liquid storage cavity, a liquid injection opening, and an injection structure; the injection structure includes an injection tube and a sealing member; the injection tube runs through the liquid injection opening and extends into the liquid storage cavity, and a liquid inlet is formed in a side wall of the injection tube; the sealing member is arranged on one end of the injection tube in the liquid storage cavity; the sealing member is sealed from an inner wall of the liquid storage cavity, and separates the liquid inlet from the liquid storage cavity. When the injection tube is pushed into the liquid storage cavity, the liquid inlet moves into the liquid injection opening to communicate with the liquid storage cavity. When the injection tube is not pushed, the injection tube separates the liquid inlet from the liquid storage cavity.

20 Claims, 6 Drawing Sheets

ATOMIZATION DEVICE AND ELECTRONIC CIGARETTE WITH THE SAME

TECHNICAL FIELD

The present disclosure generally relates to substitutes for tobacco cigarettes, and more particularly, to an atomization device and an electronic cigarette with the same.

BACKGROUND

Electronic cigarettes are also known as virtual cigarettes or electronic atomizers. As substitutes for tobacco cigarettes, the electronic cigarettes are often used for quitting smoking. With similar appearance and flavor to tobacco cigarettes, the electronic cigarettes are generally free of harmful chemicals like tar in the cigarettes or aerosol.

Usually, the electronic cigarette includes a liquid storage cavity, an atomizer arranged on one side of the liquid storage cavity, and a cigarette holder arranged on the other side of the liquid storage cavity. Usually, the cigarette holder will be removed when the smoke oil in the liquid storage cavity is used up, then smoke oil will be injected into the liquid storage cavity. Since the cigarette holder can be opened, children may easily open the cigarette holder and touch the smoke oil inside the cigarette holder, even eat the smoke oil by mistake. Besides, leakage of the smoke oil may be caused due to air pressure in the process of injection.

SUMMARY OF THE DISCLOSURE

Therefore, the present disclosure aims to provide an atomization device and an electronic cigarette with the same.

An atomization device, wherein the atomization device includes a liquid storage cavity, a liquid injection opening, and an injection structure;

the injection structure includes an injection tube and a sealing member;

the injection tube runs through the liquid injection opening and extends into the liquid storage cavity, and a liquid inlet is formed in a side wall of the injection tube;

the sealing member is arranged on one end of the injection tube in the liquid storage cavity, the sealing member is sealed from an inner wall of the liquid storage cavity, and separates the liquid inlet from the liquid storage cavity;

when the injection tube is pushed into the liquid storage cavity, the injection tube moves into the liquid storage cavity, the sealing member is separated from the liquid injection opening, and the liquid inlet moves into the liquid injection opening to communicate with the liquid storage cavity;

an exhaust gap is defined between an outer surface of the injection tube and an inner ring of the liquid injection opening; and when the injection tube is not pushed, the injection tube moves outwards to its original place to separate the liquid inlet from the liquid storage cavity.

In an embodiment, the atomization device also includes a sleeve which communicates a space inside the liquid storage cavity and a space outside the liquid storage cavity; the sleeve includes a pipe and an annular holder arranged on an inner ring of on one end of the pipe;

the end of the sleeve where the annular holder is arranged corresponds to the liquid storage cavity, and an inner hole of the annular holder forms the liquid injection opening; and the sealing member is on an inner surface of the annular holder corresponding to the liquid storage cavity; and the sealing member is sealed from the inner surface of the annular holder.

In an embodiment, the injection structure further includes a reset member, and the reset member abuts the injection tube and the sleeve respectively; the reset member provides elastic force to drive the sleeve to move outwards such that the sealing member is sealed from the annular holder.

In an embodiment, the reset member is sleeved on the injection tube; a positioning stage abutting against the reset member is provided outside the injection tube; and one end of the reset member abuts the positioning stage, and the other end of the reset member abuts the annular holder.

In an embodiment, the atomization device includes a liquid storage device, and the liquid storage cavity is formed in the liquid storage device; the liquid storage device includes a mounting hole; and the sleeve is inserted into the mounting hole, and one end of the sleeve where the annular holder is located is in the liquid storage cavity.

In an embodiment, an inner end of the injection tube is enclosed; and the sealing member includes a mounting base and a sealing ring, the mounting base is mounted in the injection tube, and the sealing ring is sleeved on an outer ring of the mounting base.

In an embodiment, at least one annular convex is arranged along a circumference of one side of the sealing ring adjacent to the liquid injection opening.

In an embodiment, a sleeving tube is arranged on an outer end of the injection tube, a size of an inner hole of the sleeving tube is larger than that of an inner hole in the injection tube;

a trumpet-shaped guiding portion is formed between the sleeving tube and the injection tube, and one end of the guiding portion is bigger than the other end; the bigger end of the guiding portion is connected to the sleeving tube, and the smaller end of the guiding portion is connected to the injection tube; and a size of the bigger end of the guiding portion is larger than that of an inner ring of the sleeve.

In an embodiment, an exhaust cavity is formed between an inner surface of the sleeve and an outer surface of the injection tube; an outer end of the sleeve includes an opening hole; the exhaust gap, the exhaust cavity, and the opening hole forms an exhaust channel communicating the liquid storage cavity with the external environment.

The present disclosure further provides an electronic cigarette having the above electronic cigarette device.

In the present disclosure, an exhaust gap is defined between an outer surface of the injection tube and an inner ring of the liquid injection opening; when the injection mouth and the injection pipe on the smoke oil bottle push the injection tube and inject smoke oil into the injection tube, the air in the liquid storage cavity can run out from the electronic cigarette through the exhaust gap, thus, it can balance the air pressure inside and outside the liquid storage cavity, and the smoke oil will not overflow from the injection tube because the air pressure will not block up the smoke oil from the liquid storage cavity.

BRIEF DESCRIPTION OF THE DRAWINGS

The present disclosure will be described in more detail with reference to the accompany drawings and the embodiments, wherein in the drawings.

PREFERRED EMBODIMENTS

The preferred embodiments are illustrated in detail with reference to the attached drawings so as to have a clearer understanding of the technical characteristics, purpose and effect of the present disclosure.

Figure 1:
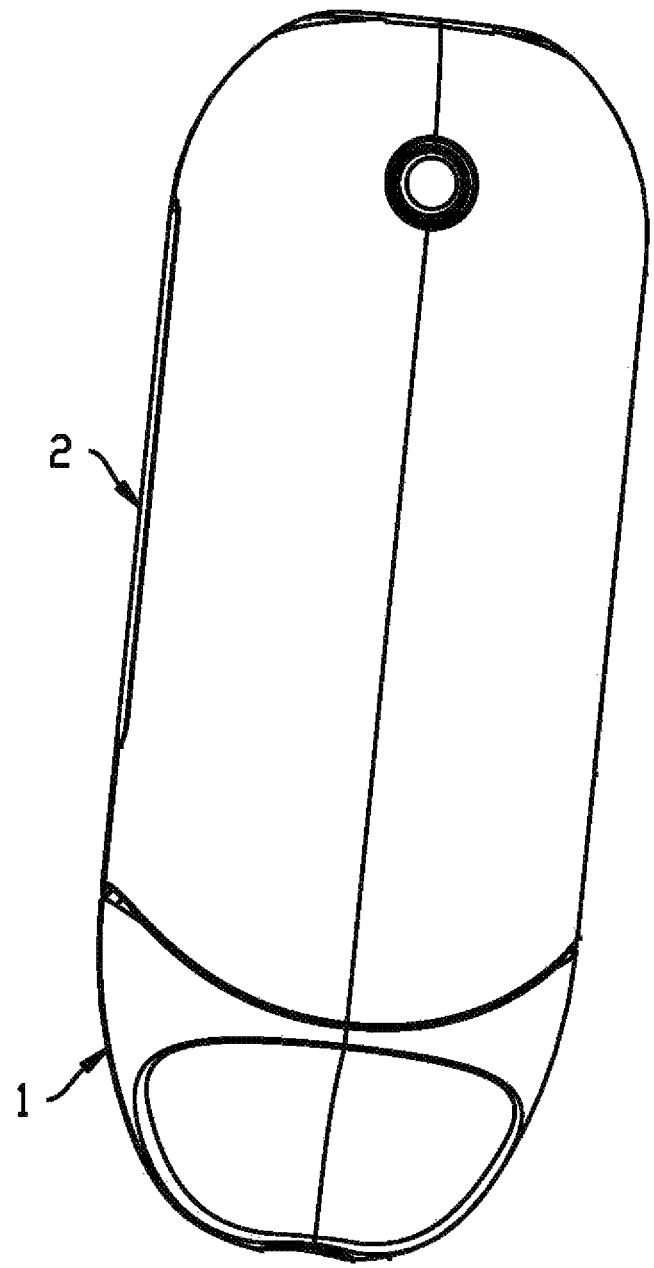
FIG. 1 is a three-dimension assembled view of an electronic cigarette in accordance with an embodiment of the present disclosure.
Figure 2:
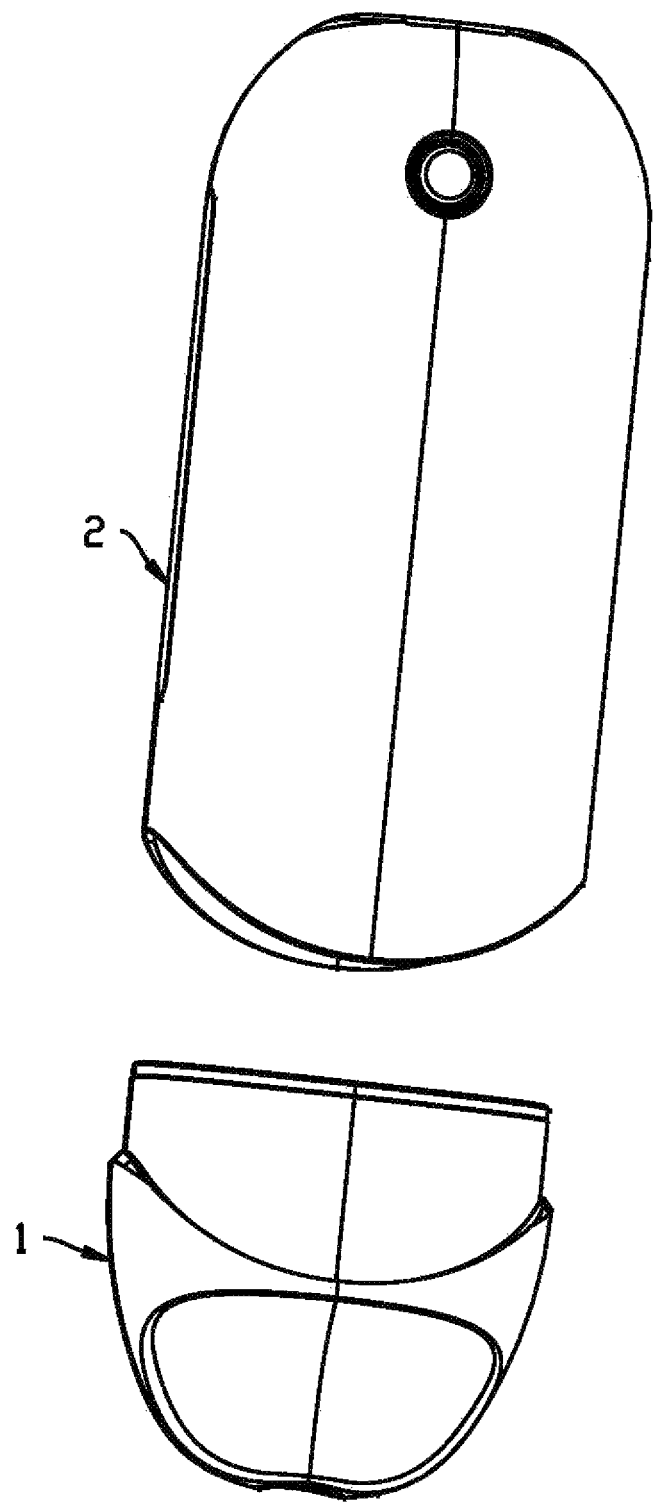
FIG. 2 is a three-dimension exploded view of the electronic cigarette of FIG. 1 in accordance with an embodiment of the present disclosure.
Figure 3:
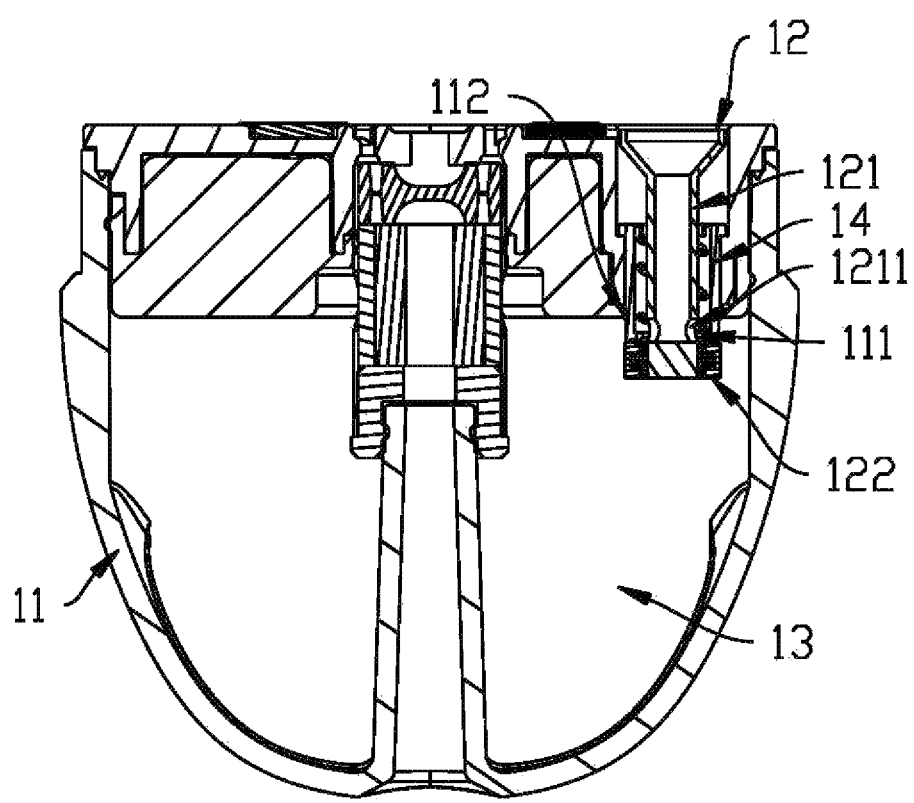
FIG. 3 is a cross-sectional view of an atomization device of FIG. 2 being not in a liquid injection process in which a liquid inlet is separated from a liquid storage cavity in accordance with an embodiment of the present disclosure.
Figure 4:
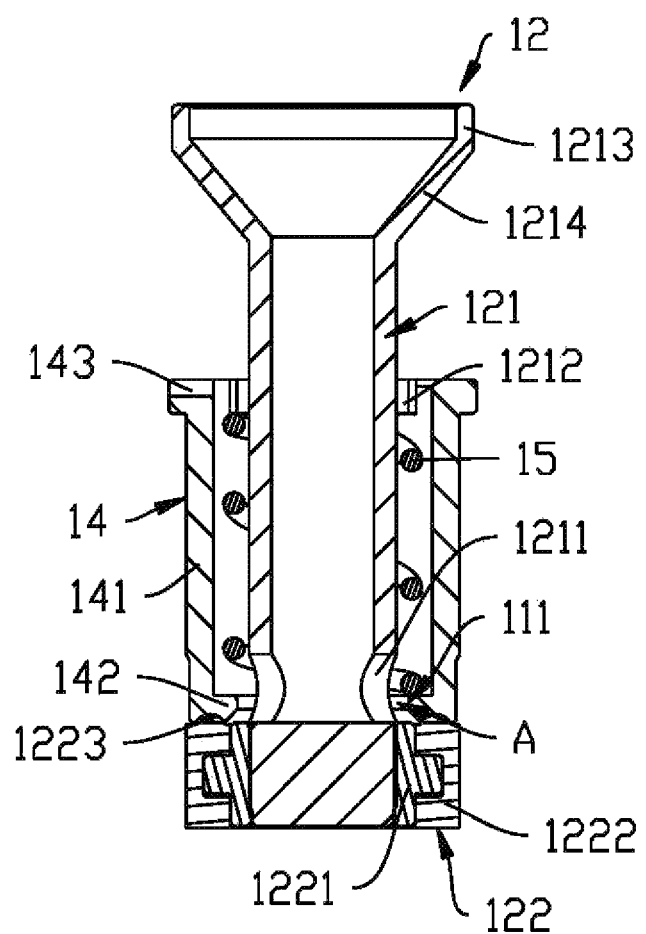
FIG. 4 is a cross-sectional view showing an injection structure and a sleeve of FIG. 3 in an assembled state in accordance with an embodiment of the present disclosure.
Figure 5:
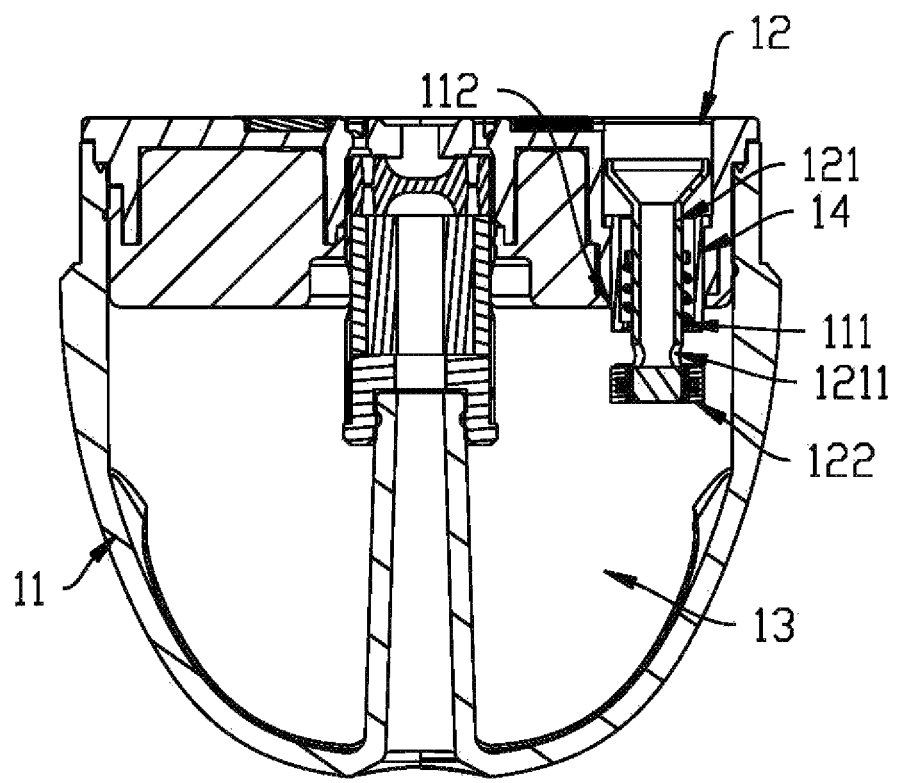
FIG. 5 is a cross-sectional view of the atomization device of FIG. 2 in a liquid injection process in which the liquid inlet is communicating with the liquid storage cavity in accordance with an embodiment of the present disclosure.
Figure 6:
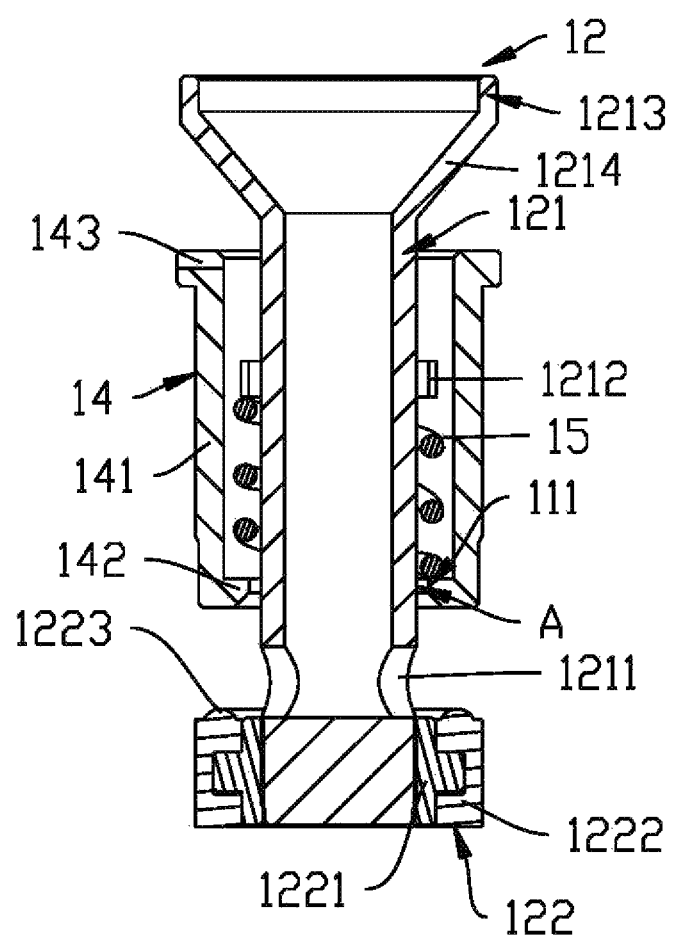
FIG. 6 is a cross-sectional view showing the injection structure and the sleeve of FIG. 5 in an assembled state in accordance with an embodiment of the present disclosure.

As shown from FIG. 1 to FIG. 2, an electronic cigarette includes an atomization device 1 and a power supply device 2 in some embodiments of the present disclosure. The power supply device 2 supplies electricity to the atomization device 1 such that the atomization device 1 can heat and atomize smoke oil for smoker.

As shown from FIG. 3 to FIG. 6, the atomization device 1 includes a liquid storage device 11 and an injection structure 12. A liquid storage cavity 13 is formed in the liquid storage device 11. The liquid storage device 11 includes a liquid injection opening 111 such that liquid can be injected into the liquid storage cavity 13 through the liquid injection opening 111.

In some embodiments, the injection structure 12 includes an injection tube 121 and a sealing member 122. The injection tube 121 runs through the liquid injection opening 111 and extends into the liquid storage cavity 13. A liquid inlet 1211 is formed in a sidewall of the injection tube 121.

The sealing member 122 is arranged on one end of the injection tube 121 in the liquid storage cavity 13, the sealing member 122 is sealed from an inner wall of the liquid storage cavity 13 to separate the liquid inlet 1211 from the liquid storage cavity 13.

When the injection tube 121 is pushed into the liquid storage cavity 13, the injection tube 121 moves into the liquid storage cavity 13, the sealing member 122 is separated from the liquid injection opening 111, and the liquid inlet 1211 moves into the liquid injection opening 111 to communicate with the liquid storage cavity 13, thus, it is convenient to inject smoke oil into the liquid storage cavity 13 through the liquid inlet 1211 of the injection tube 121.

An exhaust gap A is defined between an outer surface of the injection tube 121 and an inner ring of the liquid injection opening 111. When an injection mouth or injection pipe on a smoke oil bottle pushes the injection tube 121 and inject smoke oil into the injection tube 121, the air in the liquid storage cavity 13 can discharge from the electronic cigarette through the exhaust gap A to balance the air pressure inside and outside the liquid storage cavity 13, thus, the smoke oil will not overflow from the injection tube 121 because the air pressure will not block the injection of the smoke oil into the liquid storage cavity 13.

In the process of pushing the injection tube 121 by the smoke oil bottle, the injection mouth of the smoke oil bottle will suffer a counterforce and move into the smoke oil bottle to open the oil outlet in the injection mouth, thus, the smoke oil can flow out through the injection mouth. After the liquid inlet 1211 of the injection tube 121 communicates with the liquid storage cavity 13, the smoke oil is injected to the atomization device 1 by flowing through the injection mouth, the injection tube 121, and the liquid inlet 1211 to the liquid storage cavity 13.

In addition, when the injection tube 121 is not pushed, the injection tube 121 moves outwards to the original place to separate the liquid inlet 1211 from the liquid storage cavity 13, thus, the leakage of the smoke oil injected into the liquid storage cavity 13 can be avoided.

In some embodiments, the atomization device 1 also includes a sleeve 14 which communicates a space inside the liquid storage cavity 13 with a space outside the liquid storage cavity 13. The sleeve 14 includes a pipe 141 and an annular holder 142 arranged on an inner ring of on one end of the pipe 141.

In some embodiments, the liquid storage device 11 defines a mounting hole 112, and the sleeve 14 is inserted into the mounting hole 112. One end of the sleeve 14 where the annular holder 142 is located is in the liquid storage cavity 13, and an inner hole of the annular holder 142 forms the liquid injection opening 111. When the injection tube 121 moves out of the liquid injection opening 111, the sealing member 122 is on an inner surface of the annular holder 142 corresponding to the liquid storage cavity 13, and the sealing member 122 is sealed from the inner surface of the annular holder 142, thus, the leakage of the smoke oil injected into the liquid storage cavity 13 can be avoided.

The location of the inside end of the sleeve 14 is not limited to this embodiment, it can be in the liquid storage cavity 13, or it can flush with the inner wall of the liquid storage cavity 13, or be embedded in an inner wall of the liquid storage device 11. The location of the annular holder 142 also can be adjusted correspondingly to allow the smoke oil to be injected into the liquid storage cavity 13 through the liquid injection opening 111. In other embodiments, the sleeve 14 can also be integrated with the liquid storage device 11.

In some embodiment, an inner end of the injection tube 121 is enclosed, and the sealing member 122 is sleeved on one end of the injection tube 121. The sealing member 122 includes a mounting base 1221 and a sealing ring 1222; the mounting base 1221 is mounted on the inner end of the injection tube 121, and the sealing ring 1222 is sleeved on an outer ring of the mounting base 1221.

The sealing ring 1222 can be made of flexible material. One end of the annular convex 1223 is arranged along a circumference of one side of the sealing ring 1222 adjacent to the liquid injection opening 111. The circular convex 1223 can be compressed and deformed easily, thus, the circular convex 1223 can help to seal the sealing ring 1222 from the annular holder 142 more effectively.

In other embodiments, the inner end of the injection tube 121 can be unclosed, and the sealing member 122 can be sealed from the inner end of the injection tube 121 after the installation of the sealing member 122.

In order to allow the sleeve 14 to move outwards to be reset automatically, the injection structure 12 further includes a reset member 15. The reset member 15 abuts the injection tube 121 and the sleeve 14 respectively and provides elastic force to drive the sleeve 14 to move outwards such that the sealing member 122 is sealed from the annular holder 142.

In some embodiments, the reset member 15 is sleeved on the injection tube 121, and a positioning stage 1212 abutting against the reset member 15 is provided outside the injection tube 121. One end of the reset member 15 abuts the positioning stage 1212, and the other end of the reset member 15 abuts the annular holder 142. When the injection tube 121 moves into the liquid storage cavity 13, the reset member 15 is compressed; after the smoke oil bottle is removed, the inward force implied to the injection tube 121 disappears, and the reset member 15 resets the injection tube 121 outwards.

In other embodiments, the injection structure 12 can further include a plurality of reset members 15 arranged around the circumference of the injection tube 121. Two ends of the reset member 15 are clamped to the positioning stage 1212 and the annular holder 142 to be positioned, thus, the reset member 15 can provide resetting elastic force.

A sleeving tube 1213 is arranged on an outer end of the injection tube 121. A size of an inner hole of the sleeving tube 1213 is greater than that of an inner hole in the injection tube 121, thus, when the smoke oil is injected, it is convenient to insert the injection mouth firstly into the sleeving tube 1213, and it is convenient to push the injection tube 121 with the size difference between the injection tube 121 and the sleeving tube 1213.

In some embodiments, a trumpet-shaped guiding portion 1214 is formed between the sleeving tube 1213 and the injection tube 121, and one end of the guiding portion is bigger than the other end; the bigger end of the guiding portion 1214 is connected to the sleeving tube 1213, and the smaller end of the guiding portion 1214 is connected to the injection tube 121. The injection mouth of the smoke oil bottle can be close to the outer end of the injection tube 121 through the guiding portion 1214, and can push the injection tube 121 into the liquid storage cavity 13 with the guiding portion 1214, thus, the smoke oil can flow to the injection tube 121 through an inclined surface of the guiding portion 1214.

A size of the bigger end of the guiding portion 1214 is larger than that of an inner ring of the sleeve 14. When the smoke oil is injected into the smoke oil bottle, the guiding portion 1214 can abut the sleeve 14 and limit the moving position of the injection tube 121 into the liquid storage cavity 13; thus, excessive displacement of the guiding portion 1214 can be prevented to avoid damage to other components.

An exhaust cavity is formed between an inner surface of the sleeve 14 and the outer surface of the injection tube 121, and an outer end of the sleeve 14 defines an opening hole 143. The exhaust gap A, the exhaust cavity, and the opening hole 143 forms an exhaust channel communicating the liquid storage cavity 13 with the external environment; when the guiding portion 1214 abuts the outer end of the sleeve 14, the exhaust cavity can still be connected with the external environment by the opening hole 143 and exhaust normally.

It can be understood that although the alternative solutions of the atomization device in the above mentioned embodiments mainly elaborate the difference from those in the embodiments pre-mentioned, if they are not contradictory, they can replace with each other.

What mentioned above are only the embodiments of the present disclosure, which are not to limit the scope of the patent of the present disclosure. Any equivalent structure or equivalent transformation of the procedure made with the specification and the pictures attached of the present disclosure, or directly or indirectly using the specification and the pictures attached of the present disclosure into other relevant technical fields, is included in the scope of the patent protection of the present disclosure.

What is claimed is:

1. An atomization device (1), wherein the atomization device (1) comprises a liquid storage cavity (13), a liquid injection opening (111), and an injection structure (12); the injection structure (12) comprises an injection tube (121) and a sealing member (122);
    the injection tube (121) runs through the liquid injection opening (111) and extends into the liquid storage cavity (13), and a liquid inlet (1211) is formed in a side wall of the injection tube (121);
    the sealing member (122) is arranged on one end of the injection tube (121) in the liquid storage cavity (13), the sealing member (122) is sealed from an inner wall of the liquid storage cavity (13), and separates the liquid inlet (1211) from the liquid storage cavity (13);
    when the injection tube (121) is pushed into the liquid storage cavity (13), the injection tube (121) moves into the liquid storage cavity (13), the sealing member (122) is separated from the liquid injection opening (111), and the liquid inlet (1211) moves into the liquid injection opening (111) to communicate with the liquid storage cavity (13);
    an exhaust gap (A) is defined between an outer surface of the injection tube (121) and an inner ring of the liquid injection opening (111); and
    when the injection tube (121) is not pushed, the injection tube (121) moves outwards to its original place to separate the liquid inlet (1211) from the liquid storage cavity (13).

2. The atomization device (1) of claim 1, wherein the atomization device (1) also comprises a sleeve (14) which communicates a space inside the liquid storage cavity (13) and a space outside the liquid storage cavity (13); the sleeve (14) comprises a pipe (141) and an annular holder (142) arranged on an inner ring of on one end of the pipe (141);
    the end of the sleeve (14) where the annular holder (142) is arranged corresponds to the liquid storage cavity (13), and an inner hole of the annular holder (142) forms the liquid injection opening (111); and
    the sealing member (122) is on an inner surface of the annular holder (142) corresponding to the liquid storage cavity (13); and the sealing member (122) is sealed from the inner surface of the annular holder (142).

3. The atomization device (1) of claim 2, wherein the injection structure (12) further comprises a reset member (15), and the reset member (15) abuts the injection tube (121) and the sleeve (14) respectively; the reset member (15) provides elastic force to drive the sleeve (14) to move outwards such that the sealing member (122) is sealed from the annular holder (142).

4. The atomization device (1) of claim 3, wherein the reset member (15) is sleeved on the injection tube (121); a positioning stage (1212) abutting against the reset member (15) is provided outside the injection tube (121); and one end of the reset member (15) abuts the positioning stage (1212), and the other end of the reset member (15) abuts the annular holder (142).

5. The atomization device (1) of claim 2, wherein the atomization device (1) comprises a liquid storage device (11), and the liquid storage cavity (13) is formed in the liquid storage device (11);

the liquid storage device (11) comprises a mounting hole (112); and the sleeve (14) is inserted into the mounting hole (112), and one end of the sleeve (14) where the annular holder (142) is located is in the liquid storage cavity (13).

6. The atomization device (1) of claim 1, wherein an inner end of the injection tube (121) is enclosed; and the sealing member (122) comprises a mounting base (1221) and a sealing ring (1222), the mounting base (1221) is mounted in the injection tube (121), and the sealing ring (1222) is sleeved on an outer ring of the mounting base (1221).

7. The atomization device (1) of claim 6, wherein at least one annular convex (1223) is arranged along a circumference of one side of the sealing ring (1222) adjacent to the liquid injection opening (111).

8. The atomization device (1) of claim 2, wherein a sleeving tube (1213) is arranged on an outer end of the injection tube (121), a size of an inner hole of the sleeving tube (1213) is larger than that of an inner hole in the injection tube (121);
    a trumpet-shaped guiding portion (1214) is formed between the sleeving tube (1213) and the injection tube (121), and one end of the guiding portion is bigger than the other end; the bigger end of the guiding portion (1214) is connected to the sleeving tube (1213), and the smaller end of the guiding portion (1214) is connected to the injection tube (121); and
    a size of the bigger end of the guiding portion (1214) is larger than that of an inner ring of the sleeve (14).

9. The atomization device (1) of claim 2, wherein an exhaust cavity is formed between an inner surface of the sleeve (14) and an outer surface of the injection tube (121); an outer end of the sleeve (14) comprises an opening hole (143); the exhaust gap (A), the exhaust cavity, and the opening hole (143) forms an exhaust channel communicating the liquid storage cavity (13) with the external environment.

10. The atomization device (1) of claim 3, wherein an exhaust cavity is formed between an inner surface of the sleeve (14) and an outer surface of the injection tube (121); an outer end of the sleeve (14) comprises an opening hole (143); the exhaust gap (A), the exhaust cavity, and the opening hole (143) forms an exhaust channel communicating the liquid storage cavity (13) with the external environment.

11. The atomization device (1) of claim 4, wherein an exhaust cavity is formed between an inner surface of the sleeve (14) and an outer surface of the injection tube (121); an outer end of the sleeve (14) comprises an opening hole (143); the exhaust gap (A), the exhaust cavity, and the opening hole (143) forms an exhaust channel communicating the liquid storage cavity (13) with the external environment.

12. The atomization device (1) of claim 5, wherein an exhaust cavity is formed between an inner surface of the sleeve (14) and an outer surface of the injection tube (121); an outer end of the sleeve (14) comprises an opening hole (143); the exhaust gap (A), the exhaust cavity, and the opening hole (143) forms an exhaust channel communicating the liquid storage cavity (13) with the external environment.

13. The atomization device (1) of claim 6, wherein an exhaust cavity is formed between an inner surface of the sleeve (14) and an outer surface of the injection tube (121); an outer end of the sleeve (14) comprises an opening hole (143); the exhaust gap (A), the exhaust cavity, and the opening hole (143) forms an exhaust channel communicating the liquid storage cavity (13) with the external environment.

14. The atomization device (1) of claim 7, wherein an exhaust cavity is formed between an inner surface of the sleeve (14) and an outer surface of the injection tube (121); an outer end of the sleeve (14) comprises an opening hole (143); the exhaust gap (A), the exhaust cavity, and the opening hole (143) forms an exhaust channel communicating the liquid storage cavity (13) with the external environment.

15. The atomization device (1) of claim 8, wherein an exhaust cavity is formed between an inner surface of the sleeve (14) and an outer surface of the injection tube (121); an outer end of the sleeve (14) comprises an opening hole (143); the exhaust gap (A), the exhaust cavity, and the opening hole (143) forms an exhaust channel communicating the liquid storage cavity (13) with the external environment.

16. An electronic cigarette, comprising any atomization device (1), wherein the atomization device (1) comprises a liquid storage cavity (13), a liquid injection opening (111), and an injection structure (12); the injection structure (12) comprises an injection tube (121) and a sealing member (122);
    the injection tube (121) runs through the liquid injection opening (111) and extends into the liquid storage cavity (13), and a liquid inlet (1211) is formed in a side wall of the injection tube (121);
    the sealing member (122) is arranged on one end of the injection tube (121) in the liquid storage cavity (13), the sealing member (122) is sealed from an inner wall of the liquid storage cavity (13), and separates the liquid inlet (1211) from the liquid storage cavity (13);
    when the injection tube (121) is pushed into the liquid storage cavity (13), the injection tube (121) moves into the liquid storage cavity (13), the sealing member (122) is separated from the liquid injection opening (111), and the liquid inlet (1211) moves into the liquid injection opening (111) to communicate with the liquid storage cavity (13);
    an exhaust gap (A) is defined between an outer surface of the injection tube (121) and an inner ring of the liquid injection opening (111); and
    when the injection tube (121) is not pushed, the injection tube (121) moves outwards to its original place to separate the liquid inlet (1211) from the liquid storage cavity (13).

17. The electronic cigarette of claim 16, wherein the atomization device (1) also comprises a sleeve (14) which communicates a space inside the liquid storage cavity (13) and a space outside the liquid storage cavity (13); the sleeve (14) comprises a pipe (141) and an annular holder (142) arranged on an inner ring of on one end of the pipe (141);
    the end of the sleeve (14) where the annular holder (142) is arranged corresponds to the liquid storage cavity (13), and an inner hole of the annular holder (142) forms the liquid injection opening (111); and
    the sealing member (122) is on an inner surface of the annular holder (142) corresponding to the liquid storage cavity (13); and the sealing member (122) is sealed from the inner surface of the annular holder (142).

18. The electronic cigarette of claim 17, wherein the injection structure (12) further comprises a reset member (15), and the reset member (15) abuts the injection tube (121) and the sleeve (14) respectively; the reset member (15)

provides elastic force to drive the sleeve (14) to move outwards such that the sealing member (122) is sealed from the annular holder (142).

19. The electronic cigarette of claim 18, wherein the reset member (15) is sleeved on the injection tube (121); a positioning stage (1212) abutting against the reset member (15) is provided outside the injection tube (121); and one end of the reset member (15) abuts the positioning stage (1212), and the other end of the reset member (15) abuts the annular holder (142).

20. The electronic cigarette of claim 17, wherein the atomization device (1) comprises a liquid storage device (11), and the liquid storage cavity (13) is formed in the liquid storage device (11);

the liquid storage device (11) comprises a mounting hole (112); and the sleeve (14) is inserted into the mounting hole (112), and one end of the sleeve (14) where the annular holder (142) is located is in the liquid storage cavity (13).

* * * * *